United States Patent
Simske et al.

(10) Patent No.: US 7,046,846 B2
(45) Date of Patent: May 16, 2006

(54) DOCUMENT ANALYSIS SYSTEM AND METHOD

(75) Inventors: Steven J Simske, Greeley, CO (US); Virgil K Russon, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 10/654,547

(22) Filed: Sep. 2, 2003

(65) Prior Publication Data

US 2004/0042658 A1    Mar. 4, 2004

Related U.S. Application Data

(63) Continuation of application No. 09/296,094, filed on Apr. 21, 1999, now Pat. No. 6,674,901.

(51) Int. Cl.
*G06K 9/34* (2006.01)

(52) U.S. Cl. .................................. 382/173; 358/453
(58) Field of Classification Search ................ 382/173, 382/176; 358/453, 462
See application file for complete search history.

(56) References Cited

U.S. PATENT DOCUMENTS

| | | | |
|---|---|---|---|
| 5,987,171 A | 11/1999 | Wang | |
| 6,011,905 A | 1/2000 | Huttenlocher et al. | |
| 6,043,823 A | 3/2000 | Kodaira et al. | |
| 6,134,565 A | 10/2000 | Hommersom et al. | |
| 6,240,205 B1 | 5/2001 | Fan et al. | |

OTHER PUBLICATIONS

Pavlidis et al, "Page Segmentation and Classification" CVGIP: Graphical Models and Image Processing, vol. 54, No. 6, Nov. 1992, pp. 226-238.

*Primary Examiner*—Samir Ahmed
*Assistant Examiner*—Anand Bhatnagar

(57) ABSTRACT

Disclosed is a document analysis system and method. The document analysis system includes an interim analyzer configured to perform an interim document analysis to identify a number of interim regions on a digital document at an interim pixels-per-inch (PPI). The document analysis system also includes a complete analyzer configured to perform a complete analysis on at least one of the interim regions at a second PPI, thereby generating at least one complete region therefrom. The document analysis system and method provides significant flexibility to the user with a number of options relative to the analysis of the regions of information of interest in a digital document and to limit analysis to such preferred regions.

22 Claims, 7 Drawing Sheets

DOCUMENT ANALYSIS SYSTEM AND METHOD

CROSS-REFERENCE TO RELATED APPLICATION

This application is a continuation of U.S. patent application Ser. No. 09/296,094, filed on Apr. 21, 1999, issued on Jan. 6, 2004, as U.S. Pat. No. 6,674,901.

TECHNICAL FIELD

The present invention is generally related to document analysis and, more particularly, is related to a document analysis system and method to flexibly control the analysis of a scanned document or other digital representation of a document.

BACKGROUND OF THE INVENTION

More and more documents are generated using word processors and the like and are stored on memory devices such as hard drives, floppy disks, compact disks and other mass storage media. Nonetheless, paper and other similar media will continue to be used far into the future. Consequently, there will continually be a need to scan the substance portrayed on such media so that such information may be manipulated on a computer or other like device.

However, the scanning of paper documents to make the content thereon available in a digital environment may be time consuming and costly. In particular, one problem is that the processing of various regions of scanned documents may take a long time requiring the user to wait for an analysis of a whole document. Oftentimes, a user may only want to access a portion of the text, artwork, or other region data types of the scanned document, rather than the entire document. For example, one may wish to obtain specific paragraphs of text from a document. However, current users are often forced to wait while scan converter technology analyzes an entire document to determine the specific data types of the various regions which are ultimately applied to processing pipelines such as optical character recognition pipelines, etc.

SUMMARY OF THE INVENTION

The present invention provides a document analysis system and method. In one embodiment, the document analysis system includes a software implementation on a processor circuit, although dedicated logical circuits may be employed as well. The document analysis system includes an interim analyzer configured to perform an interim document analysis to identify a number of interim regions on a document at an initial setting of pixels-per-inch (PPI). The document system also includes a complete analyzer configured to perform a complete analysis on at least one of the interim regions at a second, higher PPI, thereby generating at least one complete region therefrom. The present invention provides significant flexibility to the user with a number of options relative to the analysis of the regions of information of interest in a document, and to limiting the analysis to such preferred regions.

The present invention can also be viewed as providing a method for controlling document region analysis. In this regard, the method can be broadly summarized by the following steps: performing an interim document analysis to identify a number of interim regions on a document at an initial pixels-per-inch (PPI); and, performing a complete analysis on at least one of the interim regions at a second, higher PPI, thereby generating at least one complete region therefrom.

The present invention has numerous advantages, a few of which are delineated hereafter as merely examples. Specifically, the present invention provides the user with a fast display of the various regions of information on a document and allows the user to control further analysis of these regions and identify the type of information contained therein before processing the regions in an appropriate processing pipeline which may use optical character recognition algorithms, etc. The present invention is also simple in design, user friendly, robust, reliable, and efficient in operation, and easily implemented for mass commercial production.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
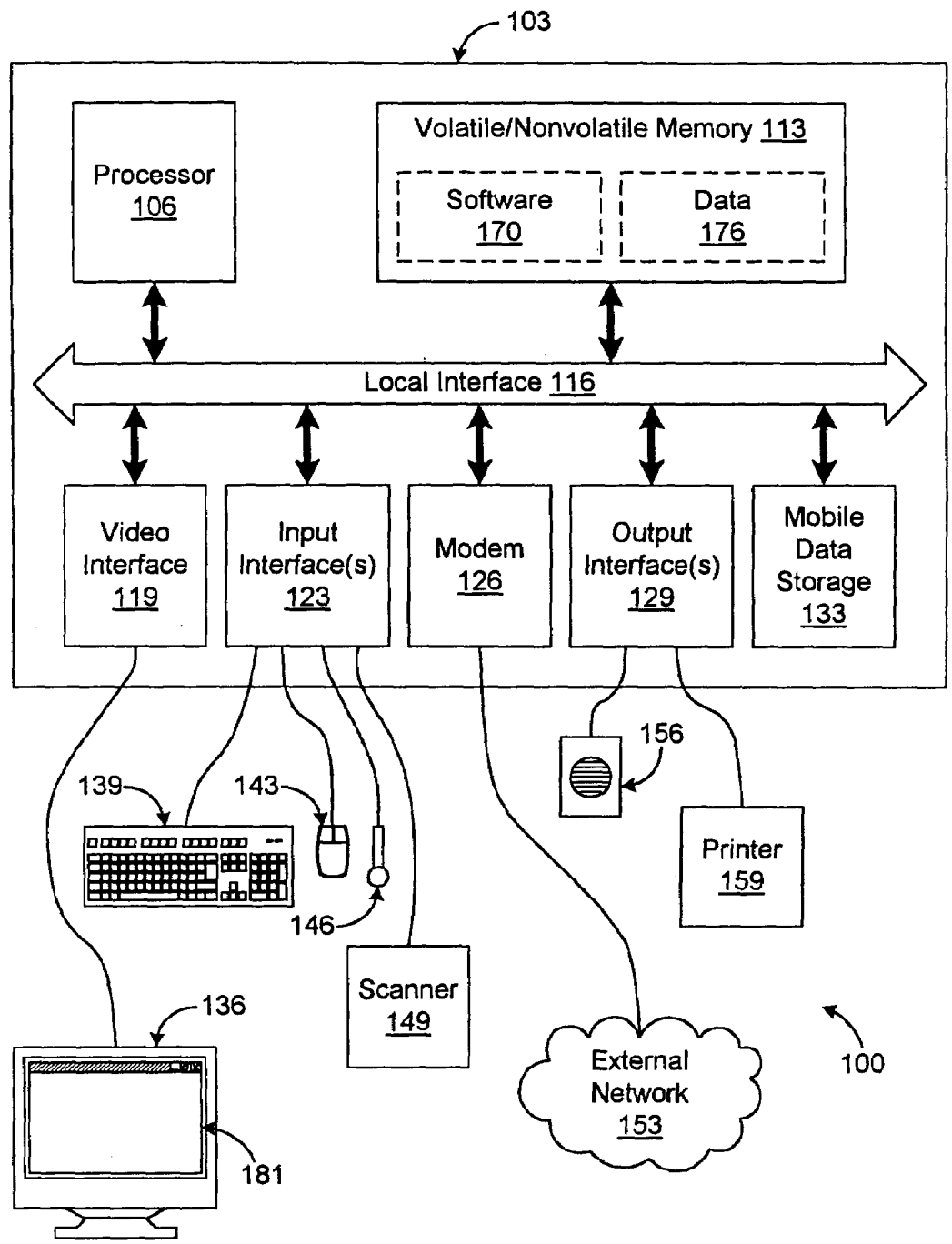
FIG. 1 is a block diagram of a document analysis system according to an embodiment of the present invention.

Referring to FIG. 1, shown is a block diagram of a document analysis system 100 according to an embodiment of the present invention. The document analysis system 100 includes a computer system 103 which comprises a processor 106, and a volatile/nonvolatile memory 113 ("memory 113"), both of which are coupled to a local interface 116. The computer system 103 further comprises a video interface 119, a number of input interfaces 123, a modem 126, a number of output interfaces 129, and a mobile data storage device 133, all of which are also coupled to the local interface 116. The memory 113 may include, for example, a random access memory (RAM), a read only memory (ROM), a hard drive, and other like devices, or any combination of these devices. Note that the term volatile refers to memory devices that generally lose data stored therein upon loss of power, and non-volatile refers to memory devices that do not lose data upon loss of power.

The document analysis system 100 also includes a display device 136 which is coupled to the local interface 116 via the video interface 119. The document analysis system 100 also includes several input devices, namely, a keyboard 139, a mouse 143, a microphone 146, and a scanner 149 which are all coupled to the local interface 116 via the various input interfaces 123. In addition, the modem 126 is coupled to an external network 153, thus allowing the computer system to send and receive data via the external network 153. The external network 153 may be, for example, the Internet, local area network (LAN), wide area network (WAN), or other similar network.

The document analysis system 100 may further include audio speakers 156, a printer 159, or other output devices which are coupled to the local interface 116 via the output interfaces 129. The mobile data storage device 133 may be one of several such devices that allow storage of data on a mobile platform such as a floppy disk drive, compact disc drive, mobile hard drive, mobile fixed memory, or other similar data storage device.

The document analysis system 100 also includes document analysis logic 170 which is generally stored on the memory 113 along with data 176. In one embodiment of the present invention, the memory 113 comprises a combination of RAM, ROM, and a hard drive, although other combinations may be used. In this embodiment, the document analysis logic 170 is software that is stored on the hard drive and the data 176 is also stored on the hard drive. When the document analysis system 100 is operational, pertinent portions of the document analysis logic 170 are loaded into the RAM and are executed by the processor 106. During operation of the document analysis system 100, the document analysis logic 170 may access pertinent portions of the data 176 stored on the hard drive, loading them into the RAM for various purposes. For example, the data 176 may comprise a bit map image of a scanned document received from the scanner 149. The data 176 may also be accessed via the mobile data storage 133 or the external network 153.

The display device 136 is employed to display any one of a number of interface displays 181 which are viewed by the user. The user interfaces with the computer system 103 via the input devices such as the keyboard 139, mouse 143, or microphone 146. The user receives audio output from the audio speakers 156 and the computer system 103 may print out various documents created on the printer 159.

Note that although the above implementation of the present invention is discussed in terms of a processor circuit and software, it is understood that other embodiments of the present invention include a dedicated logical circuit which accomplishes the functionality of the document analysis logic 170, or a combination circuit which includes a processor circuit with software and specific dedicated circuits. It is understood that all such permutations of various implementations are included herein.

Figure 2:
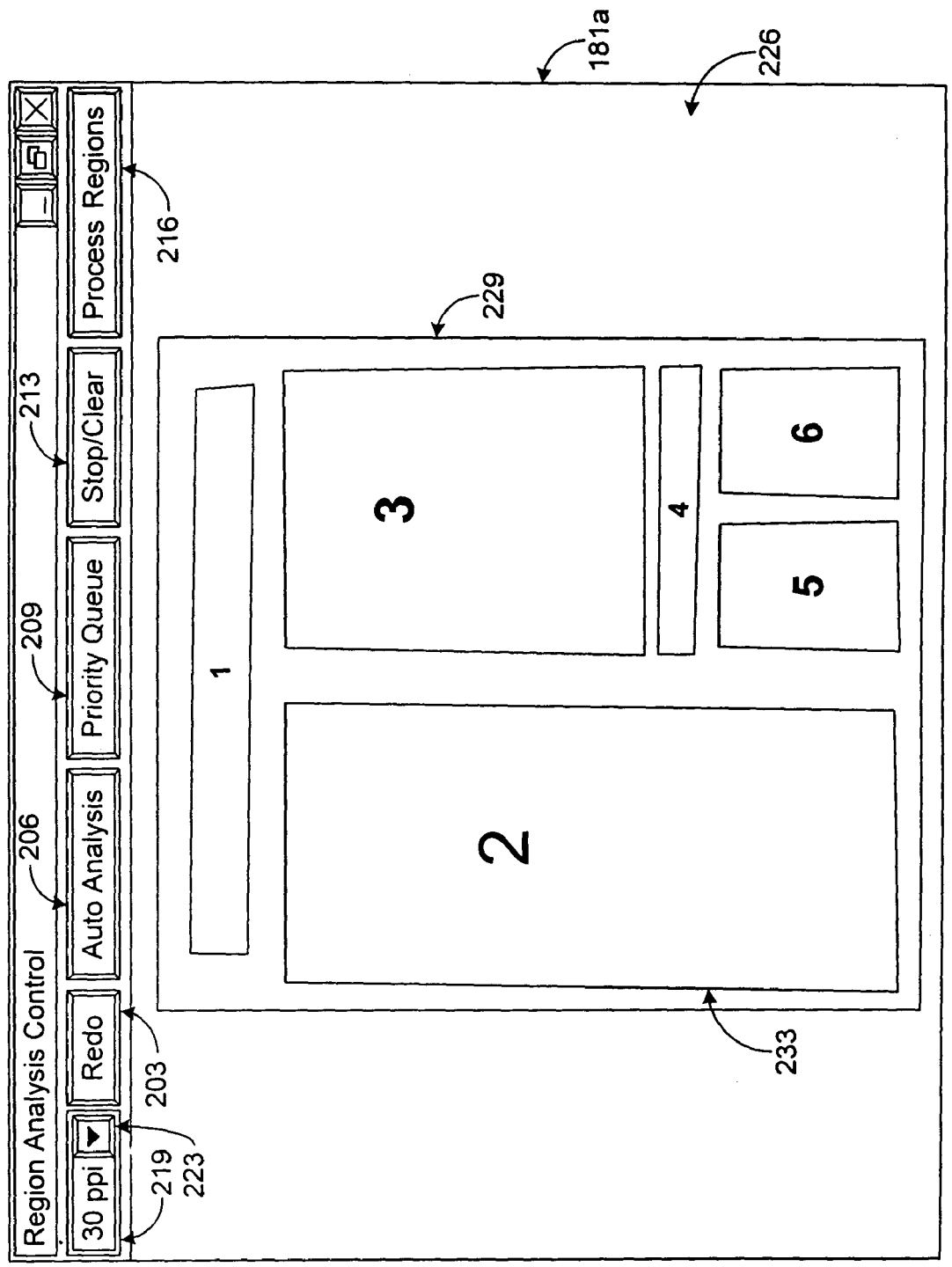
FIG. 2 is a drawing of a first interface screen shown on a display screen of the document analysis system of FIG. 1.

Turning to FIG. 2, shown is a first interface display 181a which appears on the display device 136. Across the top, the first interface display 181a includes several buttons, including a "Redo" button 203, an Auto Analysis button 206, a Priority Menu button 209, a Stop/Clear button 213, and a Process Regions button 216. The first interface display 181a also includes an interim pixels-per-inch (PPI) indicator 219 which includes a PPI pulldown button 223. Note that these buttons may be depressed or activated by manipulating a pointer to the location of the button with the mouse 143 and pressing an appropriate button on the mouse 143. Use of the mouse 143 in this manner is termed "clicking" on a particular button. Also, a voice command received from the microphone 146 and interpreted by appropriate speech recognition software may also be employed to activate the buttons or otherwise execute the functions associated with the buttons. The first interface display 181a also includes a document display region 226 within which a digital document 229 is displayed. Within the digital document 229 are several interim regions 233 which are numbered from one to six. The interim regions 233 are generated based on a data file which comprises a digital representation of a hardcopy document that was scanned by the scanner 149. The digital document may be in the form of a bit map image or other like format.

According to the present invention, the digital document 229 is generated by scanning a hardcopy document by the scanner 149. Then, an interim analysis is performed on the digital document 229 to identify the particular types of information on the document at an interim PPI. The significance of the pixels-per-inch of the analysis of the digital document warrants further explanation.

The digital document 229 is actually comprised of numerous pixels lined in rows across the front of the document as is the case, for example, of a bit map image, etc. The pixels are created, for example, by the action of the scanner 149. In analyzing the digital document 229, the rows of pixels are scrutinized with a specified resolution of a specified number of pixels-per-inch being examined to determine the boundaries of regions of text or other region data types. That is to say that not all of the pixels are examined, only a specified number of the pixels are examined per inch. The pixels examined per inch may by mapped quickly and readily from a source document with a higher PPI. According to the present invention, the interim PPI is generally less than the PPI value necessary to accurately determine the precise nature of the information on the digital document 229. Thus, based on the interim analysis, an estimate of the precise nature of the information on the digital document 229 is obtained. A significant benefit of the interim analysis is that it is fast compared to a complete and precise analysis of the digital document 229.

In performing the interim analysis, there are multiple document analysis algorithms that may be employed which include manhattan page formats and non-manhattan page formats. The algorithm used should feature segmentation that is course enough to ensure that information of a single region data type which is contained in a single region is not split up into two regions. A preferable algorithm is termed a "projection cut" or "block segmentation" algorithm which uses successive vertical and horizontal cuts through the document. Other algorithms include a "connected component/smearing" algorithm as described by Wong et al., "Document Analysis System," J. Res. Development, vol. 6, pp. 642–656, November 1982, which is incorporated herein by reference, as well as a "threshold, smear, and connected component" algorithm. A further explanation of such algorithms is found in Pavlidis et al., "Page Segmentation and Classification," CVGIP: Graphical Models and Image Processing, vol. 54, no. 6, November 1992, pp. 484–496, which is incorporated herein by reference.

The interim analysis examines the digital document 229 and obtains the estimate of the nature of the information on the digital document 229 by detecting interim regions 233. Generally, the area of each interim region 223 has predominant characteristics based upon the interim analysis, indicating that the content of the interim region 233 is of a single type, which are generally classified as text, photos, line art, or other region data type. Due to the fact that the interim analysis is performed at the relatively low interim PPI which may be, for example, approximately equal to 30 PPI, it is possible that a single interim region 233 may actually contain one or more actual regions of differing region data type. This is because the relatively lower PPI of the interim analysis does not differentiate between regions which end up with a similar appearance at the lower PPI due to smearing, projection profile interference, connected component overlap, etc.

Once the digital document 229 has been generated and the interim regions 233 have been identified, the interim regions 233 are displayed in a manner to indicate that they are, in fact, interim regions 233. For example, the interim regions 233 may include a predetermined border such as a dashed line or other type of line. The interim regions 233 may appear in a different color or may appear as a specific icon. In light of the foregoing, it should be apparent that the interim regions 233 may have any one of a multitude of appearances limited only by the capabilities of the display device 136 and driving software. All such permutations of the appearance of the interim regions 233 are included herein.

The user may highlight any one of the interim regions 233 in order to further manipulate such regions in some manner by selecting (e.g. by clicking once with the mouse) the desired interim region 229. Once an interim region is highlighted, then the user may alter the region by moving the borders or the user may delete the highlighted interim region 233 altogether.

The present invention facilitates the further or complete analysis of the interim regions 233 in order to ascertain the actual region or regions contained therein. Once a particular interim region 233 has undergone the complete analysis, the content of the actual region or regions contained therein are displayed for further manipulation by the user. In this manner, the interim regions 233 which have not undergone the complete analysis are differentiated from the actual regions resulting from the complete analysis of a former interim region 233. Note that the complete analysis is performed at a higher PPI than the interim analysis such as, for example, 75–100 PPI or higher.

Once the interim analysis is performed and the interim regions 233 are identified on the digital document 229, the user is faced with several options to further analyze the digital document 229. Specifically, in the case that the user finds that the interim regions 233 lack enough detail such as in the case, for example, of a repeated use with a similar type of document, the user may enter a new interim PPI in the interim PPI indicator 219 or the PPI pulldown button 223 may be depressed to pull down a list of potential interim PPI's from which the user may make a choice by clicking on the appropriate interim PPI with the mouse 143. Thereafter, the user may click on the Redo button 203 which sets a Redo flag stored in the memory 113 to a logical "1" and the document analysis system 100 performs the interim analysis once more at the newly entered interim PPI.

The user may also click on the Auto Analysis button 206 at which time the document analysis system 100 begins a complete analysis of each of the interim regions 233 according to a predetermined priority number that is assigned to each of the interim regions 233. If the user wishes to perform the complete analysis on a select interim region 233 or a select number of the interim regions 233, then the user can simply "double click" on the specific interim region(s) 233. The Priority Queue button 209 causes a second interface display (not shown) to appear on the display device 136 to manipulate the regions which are included in an interim region analysis queue, as will be discussed.

The user may click on the Stop/Clear button 213 which causes analysis of any selected region to cease and, the Auto Analysis button 206 is released if depressed. Finally, the "Process Regions" button 216 is provided which, when activated, allows the user to send those regions which have undergone a complete analysis to an appropriate processing pipeline-such as optical character recognition algorithm, photo editor, word processor, publisher, document creator, form package, web page maker, databases, facsimiles, copy machines, printers or other similar pipelines.

Figure 3:
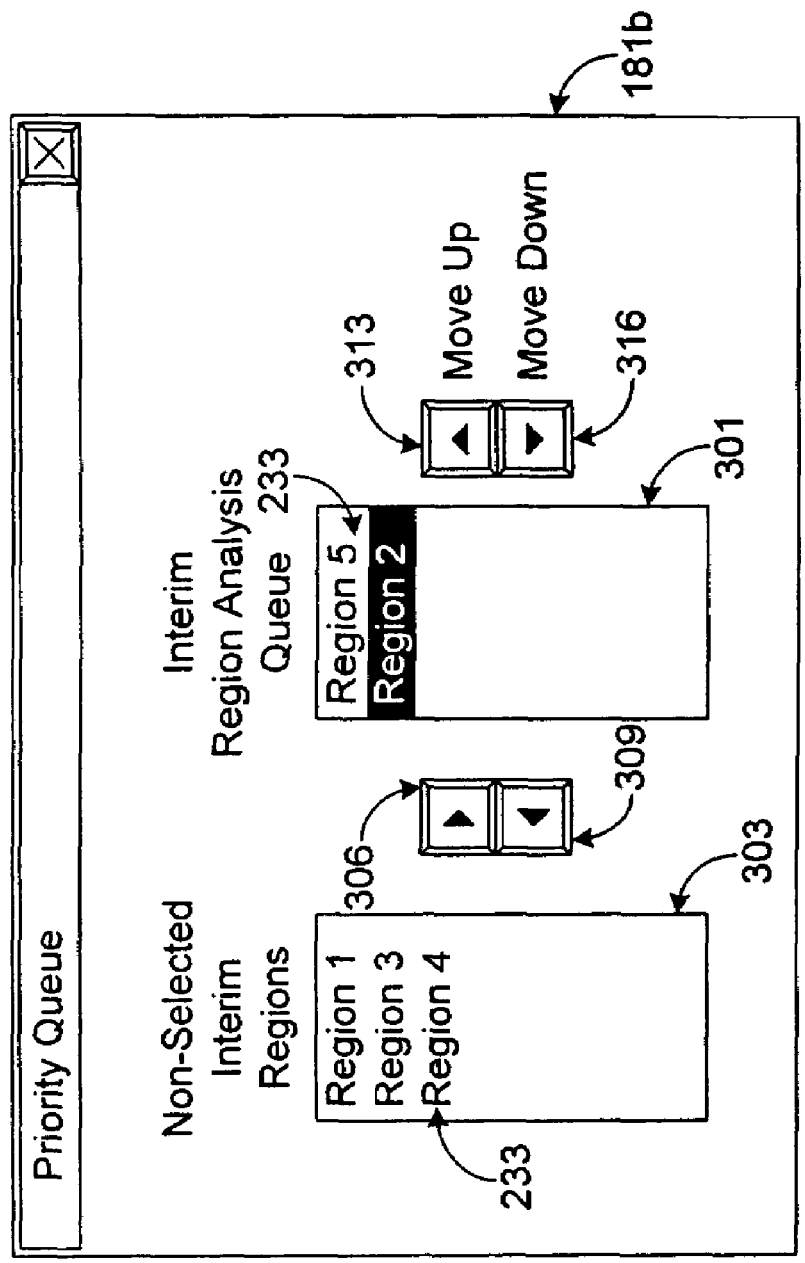
FIG. 3 is a drawing of a second interface screen shown on the display screen of the document analysis system of FIG. 1.

With reference to FIG. 3, shown is a second interface display 181b according to another embodiment of the present invention. The second interface display 181b includes an interim region priority queue 301 and a non-selected interim region list 303. The second interface display 181b also includes an add button 306, a remove button 309, a move up button 313, and a move down button 316. After the interim analysis is performed, the identified interim regions are listed in the non-selected interim region list 303. These listed interim regions 233 are then selected to be placed in the interim region analysis queue 301 in a number of ways.

For example, a region may be selected by double clicking on that interim region 233 visible on the interface when viewing the first interface display 181a (FIG. 2). Also, all of the regions may be selected by clicking on the Auto Analysis button 206 (FIG. 2). Finally, an interim region 233 may be highlighted by clicking on that to region in the non-selected interim region list 303 and then clicking on the add button 306. Likewise, an interim region 233 in the interim region analysis queue 301 may be removed therefrom by highlighting the particular interim region 233 and then clicking on the remove button 309.

Note that the interim regions 233 are listed in the interim region analysis queue 301 according to a predetermined priority, with top priority being assigned to the top most interim region 233 listed. The top priority is assigned based on the order in which the interim regions 233 are selected. In addition, the priority of the interim regions 233 may be rearranged by highlighting the appropriate region and depressing the move up and move down buttons 313 and 316 appropriately. The end result is that the highlighted region is advanced up or down the interim region analysis queue 301 accordingly. Alternatively, a single click on the interim region (as opposed to a double click) in the first interface display 181a causes that region to move to the top of the queue 301. According to the present invention, any interim region 233 placed in the interim region analysis queue 301 and at the top priority undergoes the complete analysis to identify the precise nature of the information contained within the interim regions 233 in question.

Figure 4:
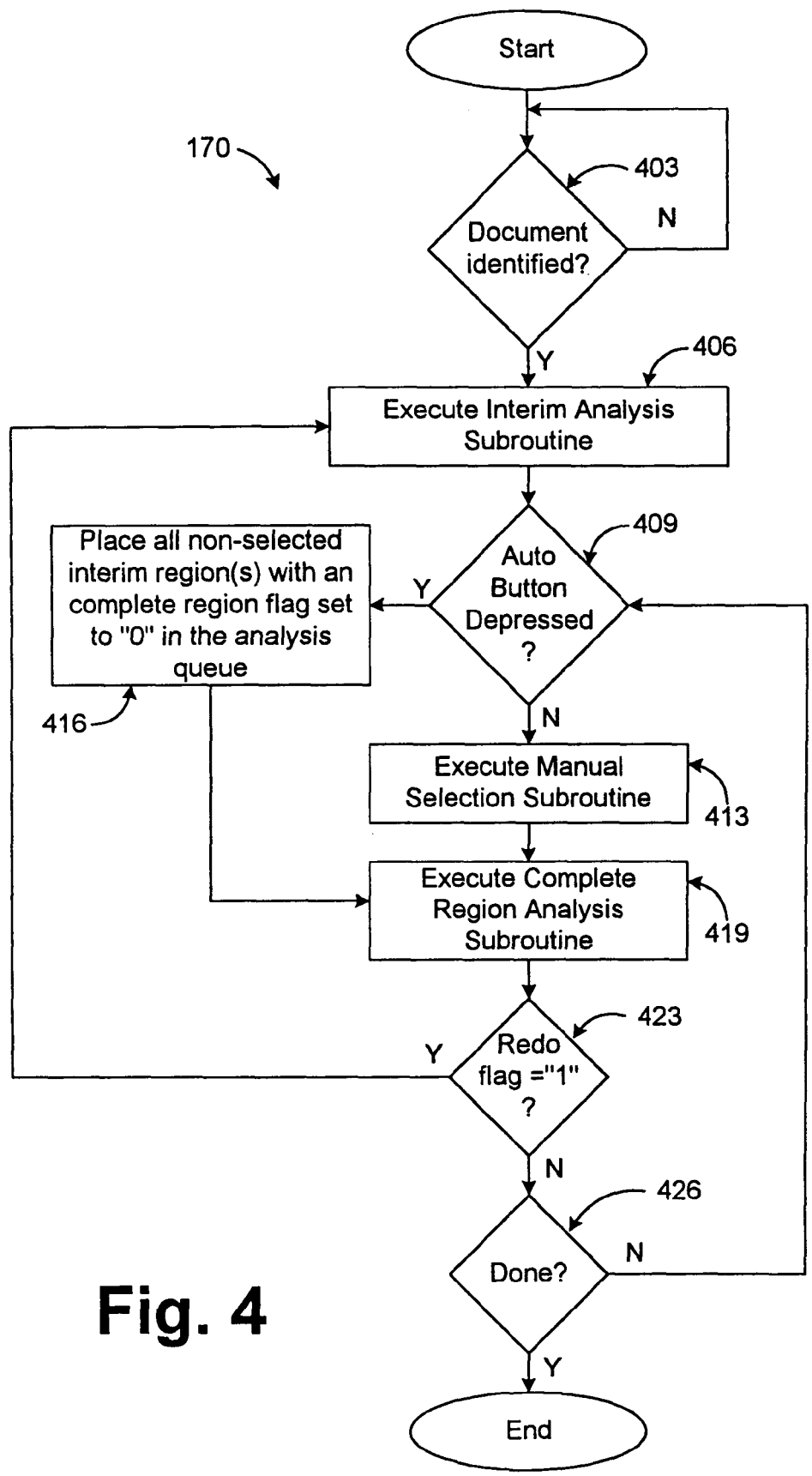
FIG. 4 is a block diagram of document analysis logic stored and executed by the document analysis system of FIG. 1.

With reference to FIG. 4, shown is a flow chart of the document analysis logic 170 (FIG. 1) according to an embodiment of the present invention. The document analysis logic 170 begins with block 403 in which a specific digital document 229 is identified for the interim analysis. This may be accomplished, for example, by choosing a document from a pick list or a scanned document may automatically be selected. If a digital document 229, then the document analysis logic 170 proceeds to block 406. If not, then the document analysis logic 170 loops back into block 406 where it ultimately remains until a document is identified. In block 406 an interim analysis subroutine is executed as will be discussed.

In block 409, the document analysis logic 170 determines whether the Auto Analysis button 206 (FIG. 2) is depressed. If the Auto Analysis button 206 is not depressed, then the operating logic proceeds to block 413. If it is depressed, then the document analysis logic 170 proceeds to block 416. In block 413, a manual selection subroutine is executed as will be discussed. In block 416, the document analysis logic 170 places all non-selected interim regions 233 with a complete region flag equal to a logical "0" into the interim region analysis queue 301. The "non-selected" interim regions are those that have not been placed in the interim region analysis queue 301. Thereafter, the document analysis logic 170 progresses to block 419.

In block 413, a manual selection subroutine is executed which controls the operation of the document analysis system 100 when the Auto Analysis button 206 (FIG. 2) is not depressed. Thereafter, the document analysis logic 170 progresses to block 419 in which a complete region analysis subroutine 419 is executed. Once the complete region analysis subroutine 419 is executed, the document analysis logic 170 moves to block 423 in which the redo flag is examined. If the redo flag is equal to a logical "1", then the document analysis logic 170 reverts back to block 406 where the interim analysis subroutine is executed once again. If the redo flag is equal to a logical "0" then the document analysis logic progresses to block 426 in which it is determined whether the document analysis logic 170 is completed. This occurs, for example, when all of the complete region flags are set to a logical "1" or when the user causes the logic to end by depressing the process regions button 216 (FIG. 2) which causes those regions with a complete region flag set to a logical "1" to be applied to appropriate processing pipelines such as optical character recognition algorithms, etc. Also, the user may select a cancel option which may be included in the first interface display 181a to end the logic 170. If in block 426, the document analysis logic 170 is not yet finished, then the logic 170 reverts back to block 409. If the logic 170 is finished, then the document analysis logic 170 ends.

Figure 5:
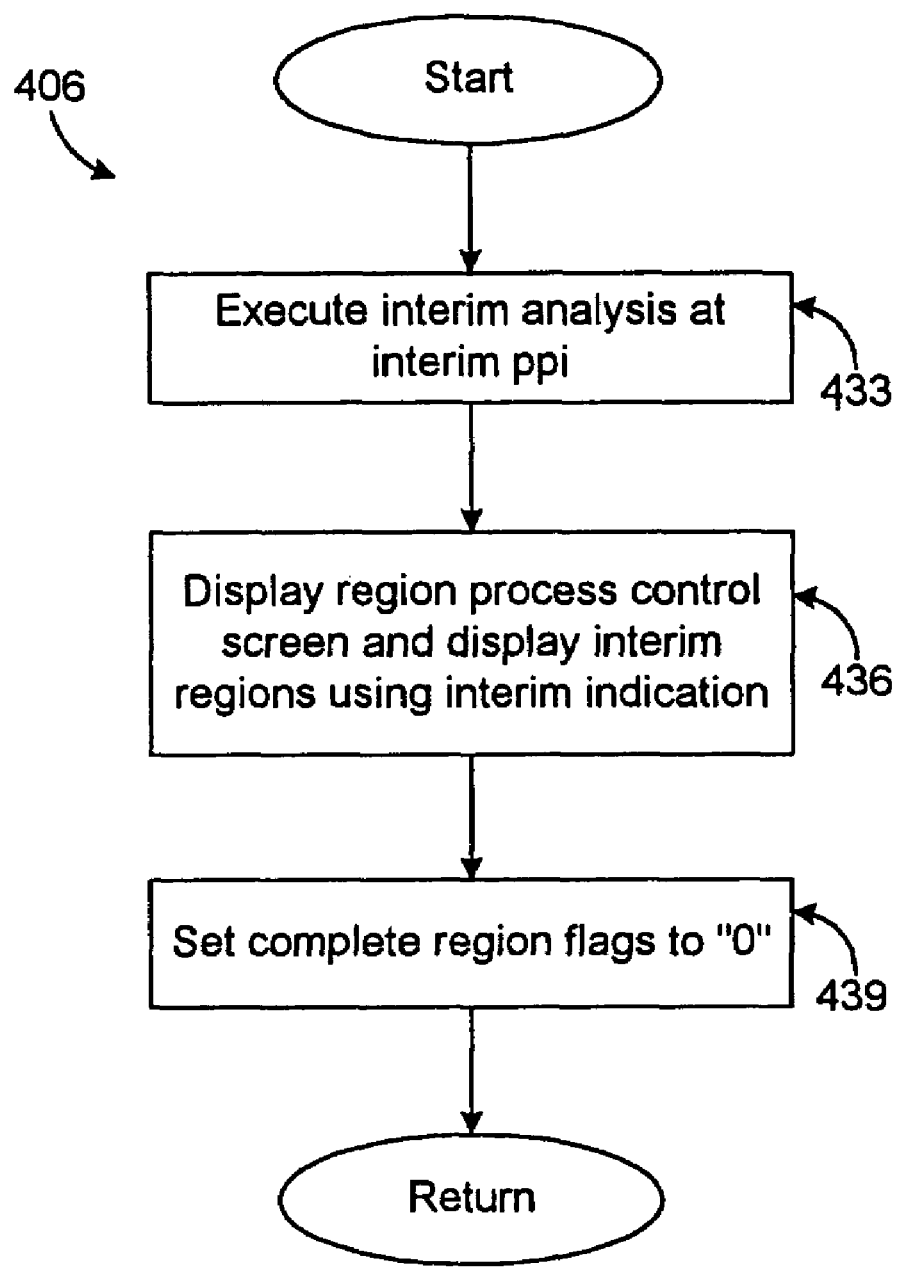
FIG. 5 is a block diagram of an interim analysis subroutine of the document analysis logic of FIG. 4.

Turning to FIG. 5, shown is a flow chart of the interim analysis subroutine 406. The interim analysis subroutine 406 begins with block 433 in which the interim analysis is performed on an identified digital document 229 (FIG. 2) at the interim PPI. Note that the digital document 229 depicted may have been scanned into the document analysis system 100 using the scanner 149 (FIG. 1) or loaded into the memory 113 from the external network 153 (FIG. 1), or the mobile data storage 133 (FIG. 1), etc.

Thereafter, the subroutine progresses to block 436 where the first interface display 181a (FIG. 2) is depicted on the display device 136 (FIG. 1) which shows the digital document 229 and the interim regions 233 identified by the interim analysis of block 433. The interim regions 233 are displayed with an interim indication as discussed previously to differentiate between those regions that have undergone the complete analysis and those that have not. Thereafter, in block 439, a number of complete region flags, each flag being associated with one of the interim regions 233 is set to a logical "0". The complete region flags may be, for example, a number of predefined bits in the memory 113 or other memory location accessible by the processor 106 (FIG. 1).

The logic of the interim analysis subroutine in conjunction with the appropriate hardware of the document analysis system may be viewed as an interim analyzer which generates the interim regions 233 based upon the digital document 229.

Figure 6:
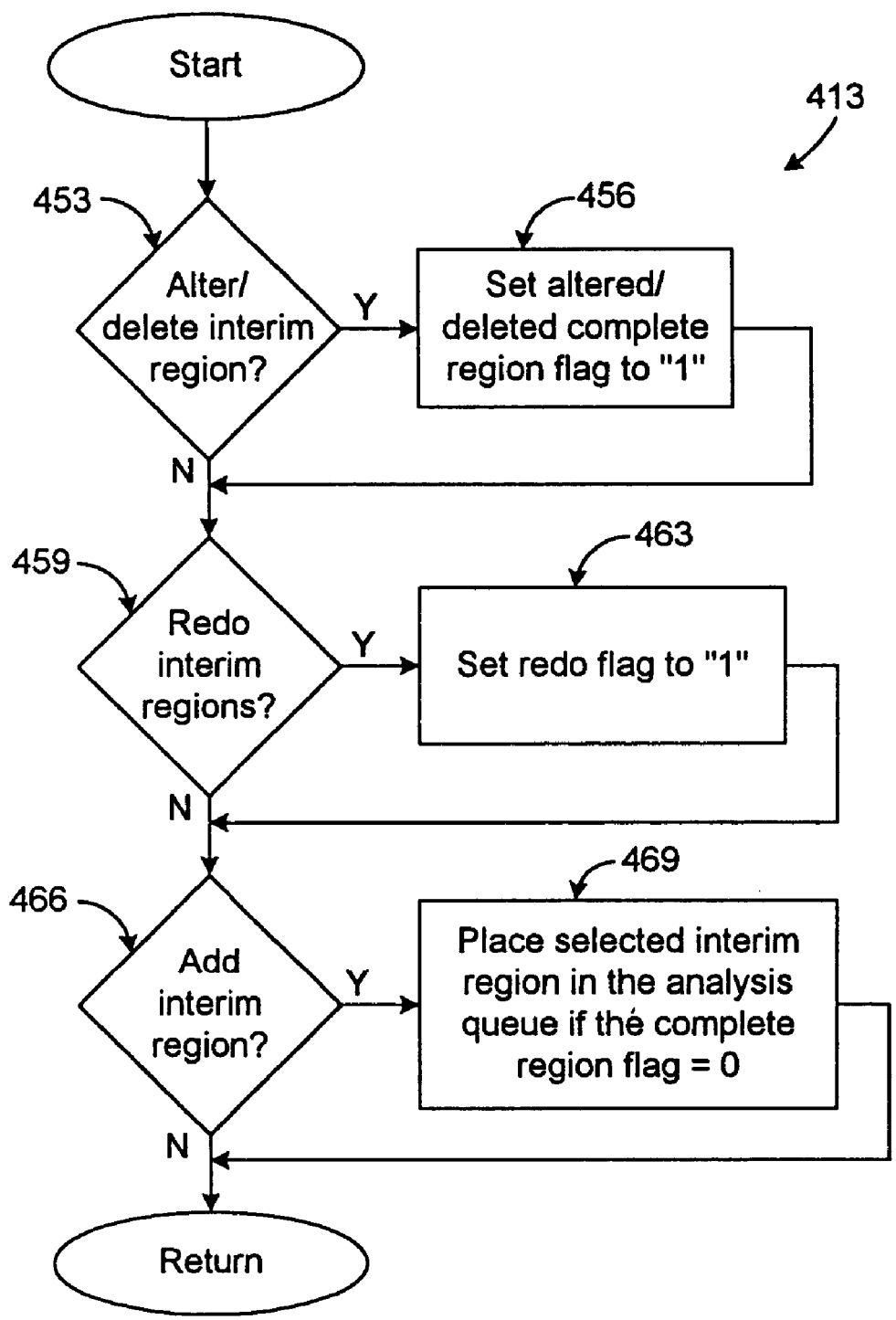
FIG. 6 is a block diagram of a manual selection subroutine of the document analysis logic of FIG. 4.

With reference to FIG. 6, shown is a flow chart of the manual selection subroutine 413. Beginning with block 453, the user may alter or delete one or more of the interim regions 233 displayed on the first interface display 181a. For example, the user may click on a particular interim region 233 to highlight it and adjust the location of borders to a known dimension according to known characteristics of the particular interim region 233 by manipulating borders with the mouse 143 (FIG. 1). Thus, the borders and corners of the interim regions 233 are generally active, interactive, tunable, or adjustable. The user may also delete an interim region by clicking on the particular interim region to highlight it and depressing the delete button, etc. If alteration or deletion of a particular interim region 233 is detected in block 453, then the subroutine moves to block 456 in which the complete region flag of the altered/deleted interim region 233 is set to a logical "1" which indicates that the altered/deleted interim region 233 need not be subjected to a complete analysis. If no alteration or deletion of an interim region occurs in block 453 or if a complete region flag has been set to a logical "1" in block 456, then the subroutine progresses to block 459.

In block 459, the subroutine determines whether the Redo button 203 (FIG. 2) has been depressed. If the Redo button 203 has been depressed, the subroutine progresses to block 463 where a redo flag is set to a logical "1". The redo flag may be, for example, a predefined bit in the memory 113 or other appropriate memory location. If the Redo button 203 has not been depressed as determined in block 459 or if the redo flag has been set to a logical "1" in block 463, then the subroutine progresses to block 466.

In block 466, the subroutine determines if the user has added a particular interim region 233 to the interim region analysis queue 301 (FIG. 3) by either double clicking on the region while viewing the first interface display 181a (FIG. 2) or by clicking on the add button 306 to add a particular highlighted region 233 while viewing the second interface display 181b. If the addition of an interim region 233 to the interim region analysis queue 301 has been detected, then the subroutine progresses to block 469. If not, then the subroutine ends and returns to the flow chart of FIG. 4. In block 469, the selected interim region 233 is placed in the interim region analysis queue if the corresponding complete region flag is a logical "0". Thereafter, the subroutine ends and returns to the flow chart of FIG. 4.

Figure 7:
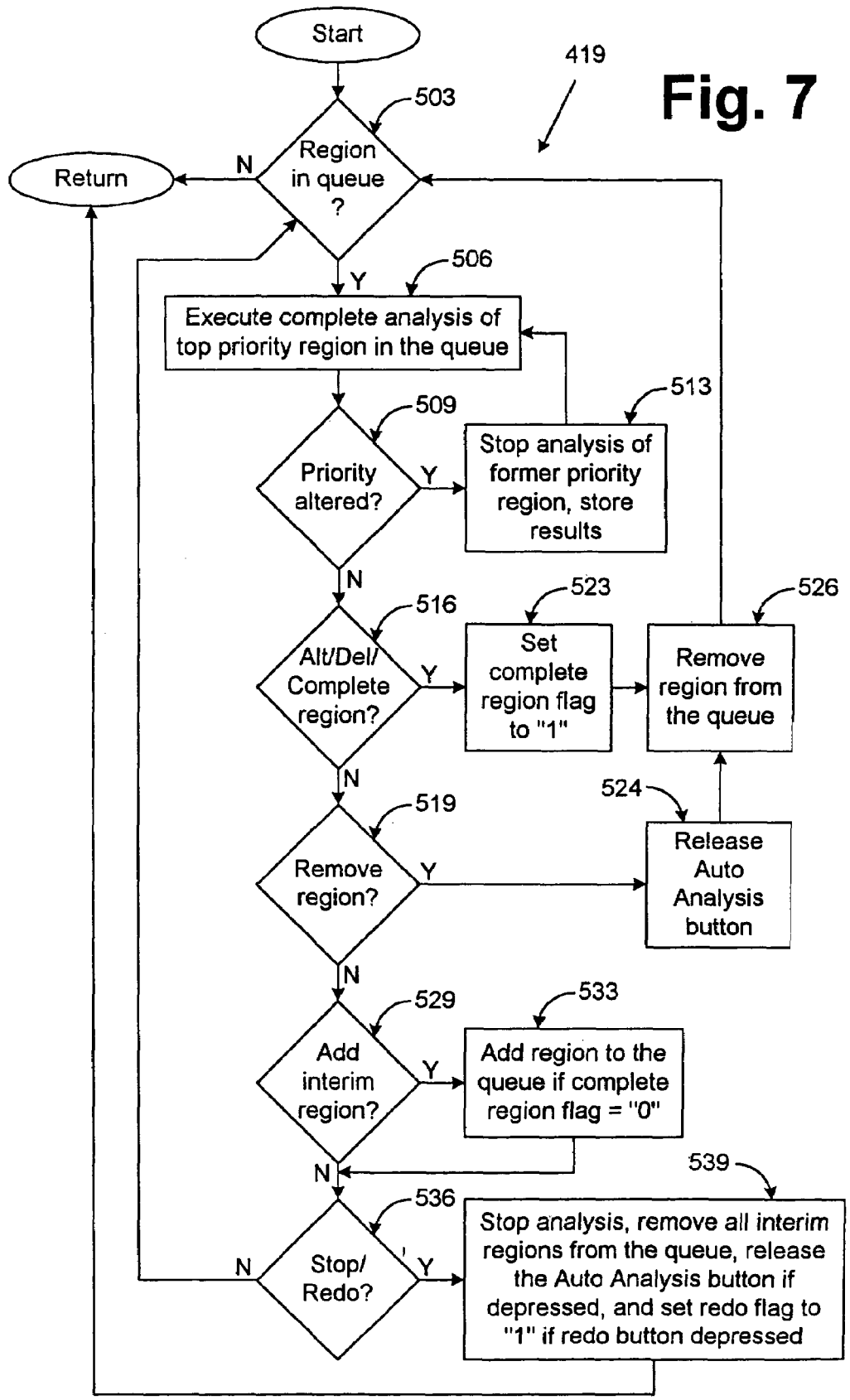
FIG. 7 is a block diagram of a complete region analysis subroutine of the document analysis logic of FIG. 4.

With reference then, to FIG. 7, shown is a flow chart of the complete region analysis subroutine 419. Beginning with block 503, the subroutine determines whether an interim region 233 (FIG. 2) has been placed in the interim region analysis queue 301 (FIG. 3). If one or more of the interim regions 233 has been placed in the queue 301, then the subroutine 419 progresses to block 506. If not, then the subroutine 419 ends and returns to the flow chart of FIG. 4. Note then, that the region analysis subroutine 419 generally waits until at least one interim region 233 has been placed into the queue 301 before performing further functionality.

In block 506, the subroutine 419 executes a complete analysis of the top priority region in the queue 301. The top priority is generally determined on a first selected-first analyzed basis. While the complete analysis is being performed on the top priority region in the queue 301, the subroutine 419 then progresses to block 509 and examines the queue 310 to see if the top priority has been altered while it undergoes a complete analysis. If such is the case, then the subroutine 419 moves to block 513 where the complete analysis is halted on the former priority region and the results of the as yet uncompleted analysis are stored in the memory 113 (FIG. 1) to be continued when that interim region is once again the top priority region. Thereafter, the subroutine 419 reverts back to block 506 in which the new top priority region undergoes a complete analysis. Note that the logic of block 506 may be viewed as a complete analyzer which provides a complete analysis of the interim regions 233 which are applied thereto.

If the priority was not altered in block 509, then the subroutine 419 moves to block 516 where it is determined whether any of the interim regions 233 in the queue 301 have been altered or deleted, or if an interim region 233 has finished the complete analysis. If not then the subroutine progresses to block 519 and If so, then the subroutine 419 progresses to block 523. In block 523, the complete region flag of the altered/deleted/completed interim region 233 is set to a logical "1" indicating that the region need not undergo a complete analysis. Thereafter, the subroutine 419 moves on to block 526 in which the particular altered/deleted/completed interim region 233 is removed from the queue 301 where the subroutine 419 is repeated without the d/deleted/completed interim region 233.

Upon reaching block 519, the subroutine 419 determines whether a particular region has been removed from the queue 301 by pressing the remove button 309 in the second interface display 181b. If such is the case, then the subroutine 419 moves to block 524 where the Auto Analysis button 206 is released if it is depressed. Thereafter, the subroutine 419 reverts to block 526 to remove the desired interim region 233 from the queue 301. If no region has been removed in block 519, then the subroutine 419 moves to block 529 where it is determined whether an interim region 233 has been added to the queue 301 by either double clicking on a desired interim region 233 on the first interface display 181a (FIG. 2), clicking on the Auto Analysis button 206 (FIG. 2), or clicking on the add button 306 in the second interface display 181b (FIG. 3). If so, then the subroutine 419 moves to block 533 in which the desired interim region 233 is added to the queue 301 if the corresponding complete region flag is set to a logical "0". In the case where the Auto Analysis button 203 has been depressed, several regions may be added to the queue at once except those regions having a complete region flag set to a logical "1". If no interim region 233 is to be added to the queue 301 in block 529 or if the appropriate interim region(s) 233 have been added to the queue 301 in block 533, then the subroutine 419 progresses to block 536.

In block 536, the subroutine determines whether the Redo button 203 or the Stop/Clear button 213 have been depressed. If so, then the subroutine 419 progresses to block 539 in which the analysis of the top priority interim region 233 in the queue 301 ceases, all interim regions 233 are removed from the queue 301, the Auto analysis button 206 is released if depressed, and the redo flag is set to a logical "1" if the redo button 203 has been depressed. Thereafter, the subroutine 419 ends and returns to the flow chart of FIG. 4. If neither the Redo button 203 nor the Stop/Clear button 213 have been depressed in block 536, then the subroutine 419 reverts back to block 503.

Thus, according to the subroutine 419, the interim regions 233 placed in the queue 301 are continually processed unless the user stops the processing by some sort of action, the document analysis system 100 reacting appropriately to provide a flexible platform for document analysis.

The present invention provides several distinct advantages to the user in analyzing documents. For example, the present invention provides a user with quick access to the content of a document via the interim analysis from which the user may further guide the analysis to be performed in an efficient manner. For example, if the user were only interested in a specific region data type such as text, then, knowing what the document actually looks like, the user may delete interim regions which would otherwise be directed to artwork or photo processing applications. This would save the time that the document analysis system would have expended in performing a complete analysis on the unwanted artwork. Thus, the present invention saves time and expense involved in analyzing documents.

In addition, the flow charts of FIGS. 4–7 show the architecture, functionality, and operation of a possible implementation of the document analysis logic 170 (FIG. 1). In this regard, each block represents a module, segment, or portion of code, which comprises one or more executable instructions for implementing the specified logical function(s). It should also be noted that in some alternative implementations, the functions noted in the blocks may occur out of the order noted in FIGS. 4–7. For example, two blocks shown in succession in FIGS. 4–7 may in fact be executed substantially concurrently or the blocks may sometimes be executed in the reverse order, depending upon the functionality involved, as will be further clarified below.

The document analysis logic 170, which preferably comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

The invention claimed is:

1. A system for controlling document region analysis, comprising:
   an interim analyzer configured to perform an interim document analysis to identify a number of interim regions on a digital document at a first pixels-per-inch (PPI); and a complete analyzer configured to perform a complete analysis on at least one of the interim regions at a second PPI, where the second PPI is a higher resolution than the first PPI, thereby generating at least one complete region therefrom.

2. The system of claim 1, further comprising a manual selector configured for a manual selection of at least one of the interim regions for the complete analysis.

3. The system of claim 1, further comprising an automatic analyzer configured to automatically select at least one of the interim regions for the complete analysis.

4. The system of claim 1, further comprising an interim region modifier configured to facilitate the manual alteration of at least one of the interim regions.

5. The system of claim 1, further comprising an interim region analysis queue to which at least one selected interim region is applied, the complete analysis being performed thereon, the interim region analysis queue having an analysis priority according to which the interim regions undergo the complete analysis.

6. The system of claim 5, further comprising an analysis queue priority controller configured to access the analysis priority of the interim region analysis queue, the interim region analysis queue being further configured to allow the alteration of the analysis priority.

7. The system of claim 1, further comprising a display interface configured to display the interim regions, wherein the interim regions are identified with an interim indication, and the completed regions being identified with a complete indication.

8. A method for controlling document region analysis, comprising:
   performing an interim document analysis to identify a number of interim regions on a digital document at a first pixels-per-inch (PPI); and
   performing a complete analysis on at least one of the interim regions at a second PPI, where the second PPI is a higher resolution than the first PPI, thereby generating at least one complete region therefrom.

9. The method of claim 8, further comprising manually selecting at least one of the interim regions for the complete analysis.

10. The method of claim 8, further comprising automatically selecting at least one of the interim regions for the complete analysis.

11. The method of claim 8, further comprising manually altering at least one of the interim regions.

12. The method of claim 8, further comprising placing at least one selected interim region into an interim region analysis queue, the complete analysis being performed thereon, the interim region analysis queue having an analysis priority according to which the interim regions undergo the complete analysis.

13. The method of claim 8, further comprising displaying the interim regions, wherein the interim regions are identified with an interim indication, and the completed regions being identified with a complete indication.

14. A method analyzing a physical document, comprising:
   scanning the physical document to obtain an electronic document;
   performing an interim document analysis on the electronic document at a first pixels-per-inch (PPI) to estimate a nature of information within at least one region of the electronic document;
   selecting at least one region of the electronic document; and
   performing a complete analysis on the at least one selected region at a second PPI, where the second PPI is a higher resolution than the first PPI.

15. The method of claim 14, further comprising performing a secondary interim analysis at a third PPI to provide a more accurate estimate of certain characteristics of content within at least one region of the electronic document, the third PPI being at a higher resolution than the first PPI and at a lower resolution than the second PPI.

16. The method of claim 15, wherein the secondary interim analysis is performed only on the at least one selected region.

17. The method of claim 14, further comprising displaying the at least on interim regions, wherein the interim regions are identified with an interim indication, and the completed regions being identified with a complete indication.

18. The method of claim 14, further comprising displaying the at least one selected region at the second PPI.

19. A system for analyzing a physical document, comprising:
   scanning logic capable of scanning the physical document to obtain an electronic document;
   logic configured to perform a first document analysis on the electronic document at a first resolution to estimate a nature of information within at least one region of the electronic document;
   logic configured permit a user to select at least one region of the electronic document; and
   logic capable of performing a second analysis on the at least one selected region at a second resolution, where the second resolution is a higher resolution than the first resolution.

20. The system of claim 19, wherein the nature of the electronic document is estimated to be one from the group consisting of text, photos, and line art.

21. The system of claim 19, wherein the first resolution is approximately 30 PPI.

22. The system of claim 19 wherein the second resolution is approximately 75–100 PPI.

* * * * *

UNITED STATES PATENT AND TRADEMARK OFFICE
CERTIFICATE OF CORRECTION

| | | |
|---|---|---|
| PATENT NO. | : 7,046,846 B2 | Page 1 of 1 |
| APPLICATION NO. | : 10/654547 | |
| DATED | : May 16, 2006 | |
| INVENTOR(S) | : Steven J Simske et al. | |

It is certified that error appears in the above-identified patent and that said Letters Patent is hereby corrected as shown below:

In column 12, line 26, in Claim 17, delete "at least on" and insert -- at least one --, therefor.

Signed and Sealed this

Nineteenth Day of May, 2009

JOHN DOLL
*Acting Director of the United States Patent and Trademark Office*